(12) United States Patent
Xiong et al.

(10) Patent No.: US 11,182,648 B2
(45) Date of Patent: Nov. 23, 2021

(54) END-TO-END MODEL TRAINING METHOD AND APPARATUS, AND NON-TRANSITORY COMPUTER-READABLE MEDIUM

(71) Applicant: BEIJING BAIDU NETCOM SCIENCE AND TECHNOLOGY CO., LTD., Beijing (CN)

(72) Inventors: Hao Xiong, Beijing (CN); Zhongjun He, Beijing (CN); Zhi Li, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/901,940

(22) Filed: Jun. 15, 2020

(65) Prior Publication Data

US 2021/0192284 A1   Jun. 24, 2021

(30) Foreign Application Priority Data

Dec. 18, 2019   (CN) .......................... 201911315572.8

(51) Int. Cl.
*G06K 9/62*    (2006.01)
*G06F 40/117*  (2020.01)
*G06N 20/00*   (2019.01)

(52) U.S. Cl.
CPC .......... *G06K 9/6257* (2013.01); *G06F 40/117* (2020.01); *G06K 9/623* (2013.01);
(Continued)

(58) Field of Classification Search
None
See application file for complete search history.

(56) References Cited

U.S. PATENT DOCUMENTS

2016/0019459 A1* 1/2016 Audhkhasi ............... G06N 3/08
                                                          706/22
2020/0167527 A1* 5/2020 Cao ..................... G06F 16/3347

FOREIGN PATENT DOCUMENTS

CN    107408111 A    11/2017
CN    107480144 A    12/2017
(Continued)

OTHER PUBLICATIONS

Chinese Patent Application No. 201911315572.8 First Office Action dated Aug. 18, 2020, 9 pages.
(Continued)

*Primary Examiner* — Kim Y Vu
*Assistant Examiner* — Nathan J Bloom
(74) *Attorney, Agent, or Firm* — Lathrop GPM LLP

(57) ABSTRACT

The present disclosure provides an end-to-end model training method and apparatus, which relates to a field of artificial intelligence technologies. The method includes: obtaining training data containing a plurality of training samples, in which the plurality of training samples include an original sequence, a target sequence and a corresponding tag list, the tag list includes importance tags in the target sequence and avoidance tags corresponding to the importance tags, and the avoidance tags are irrelevant tags corresponding to the importance tags; and adopting the training data to train a preset end-to-end model until a value of a preset optimization target function is smaller than a preset threshold.

9 Claims, 2 Drawing Sheets

(52) U.S. Cl.
CPC ......... *G06K 9/6226* (2013.01); *G06K 9/6231* (2013.01); *G06N 20/00* (2019.01)

(56) References Cited

FOREIGN PATENT DOCUMENTS

| CN | 108153913 A |   | 6/2018 |
|----|-------------|---|--------|
| CN | 108510983 A |   | 9/2018 |
| CN | 109558605 A |   | 4/2019 |
| CN | 109635305 A | * | 4/2019 |
| CN | 109635305 A |   | 4/2019 |
| CN | 110263350 A | * | 9/2019 |
| CN | 110263350 A |   | 9/2019 |
| CN | 110309514 A |   | 10/2019 |
| CN | 110364144 A |   | 10/2019 |

OTHER PUBLICATIONS

Chinese Patent Application No. 201911315572.8 English translation of First Office Action dated Aug. 18, 2020, 9 pages.

* cited by examiner obtaining training data containing a plurality of training samples, wherein the plurality of training samples comprise an original sequence, a target sequence and a corresponding tag list, the tag list comprises importance tags in the target sequence and avoidance tags corresponding to the importance tags, and the avoidance tags are irrelevant tags corresponding to the importance tags — 101 adopting the training data to train a preset end-to-end model until a value of a preset optimization target function is smaller than a preset threshold, wherein the optimization target function is determined according to the target sequence, a prediction sequence obtained after inputting the original sequence into the end-to-end model, and the tag list corresponding to the target sequence — 102

FIG. 1 obtaining a first cross entropy of each target tag in the target sequence and a corresponding prediction tag in the prediction sequence — 201 obtaining a second cross entropy of each importance tag in the target sequence and the corresponding prediction tag in the prediction sequence — 202 obtaining a third cross entropy of an avoidance tag of each importance tag in the target sequence and the corresponding prediction tag in the prediction sequence — 203 performing weighed addition on the first cross entropy, the second cross entropy, and the third cross entropy to obtain the optimization target function — 204

FIG. 2

END-TO-END MODEL TRAINING METHOD AND APPARATUS, AND NON-TRANSITORY COMPUTER-READABLE MEDIUM

CROSS-REFERENCE TO RELATED APPLICATION

The present application is based upon and claims priority to Chinese Patent Application No. 201911315572.8, filed on Dec. 18, 2019, the entire contents of which are incorporated herein by reference.

TECHNICAL FIELD

The present disclosure mainly relates to a field of data processing technologies, especially, a field of artificial intelligence technologies and more particularly, to an end-to-end model training method and apparatus, and a non-transitory computer-readable medium.

BACKGROUND

Currently, existing end-to-end learning models are trained by adopting a single target for optimization. The models can perceive good prediction results rather than poor prediction results, since poor results that greatly affect the entire result are unavoidable, the accuracies of the models are reduced.

SUMMARY

The present disclosure provides an end-to-end model training method and an end-to-end model training apparatus, in which training data may be adopted to train a preset end-to-end model until a value of a preset optimization target function is smaller than a preset threshold. Therefore, by improving the training data of the end-to-end learning model and the optimization target function, and training the end-to-end learning model in combination with the improved training data and the optimization target function, the trained end-to-end model can screen out poor results that greatly affect the entire result, thus the accuracies of the models are improved.

In an aspect, the embodiments of the present disclosure provide an end-to-end model training method. The method includes: obtaining training data containing a plurality of training samples, in which the plurality of training samples include an original sequence, a target sequence and a corresponding tag list, the tag list includes importance tags in the target sequence and avoidance tags corresponding to the importance tags, and the avoidance tags are irrelevant tags corresponding to the importance tags; and adopting the training data to train a preset end-to-end model until a value of a preset optimization target function is smaller than a preset threshold, in which the optimization target function is determined according to the target sequence, a prediction sequence obtained after inputting the original sequence into the end-to-end model, and the tag list corresponding to the target sequence.

In another aspect, the embodiments of the present disclosure provide an end-to-end model training apparatus. The apparatus includes: a non-transitory computer-readable medium including computer-executable instructions stored thereon, and an instruction execution system which is configured by the instructions to implement at least one of: an obtaining module, configured to obtain training data containing a plurality of training samples, in which the plurality of training samples include an original sequence, a target sequence and a corresponding tag list, the tag list includes importance tags in the target sequence and avoidance tags corresponding to the importance tags, and the avoidance tags are irrelevant tags corresponding to the importance tags; and a training module, configured to adopt the training data to train a preset end-to-end model until a value of a preset optimization target function is smaller than a preset threshold, in which the optimization target function is determined according to the target sequence, a prediction sequence obtained after inputting the original sequence into the end-to-end model, and the tag list corresponding to the target sequence.

In another aspect, embodiments of the present disclosure provide a non-transitory computer-readable storage medium storing computer instructions, in which when the computer instructions are executed by a processor, the processor is caused to implement an end-to-end model training method. The method includes: obtaining training data containing a plurality of training samples, in which the plurality of training samples include an original sequence, a target sequence and a corresponding tag list, the tag list includes importance tags in the target sequence and avoidance tags corresponding to the importance tags, and the avoidance tags are irrelevant tags corresponding to the importance tags; and adopting the training data to train a preset end-to-end model until a value of a preset optimization target function is smaller than a preset threshold, in which the optimization target function is determined according to the target sequence, a prediction sequence obtained after inputting the original sequence into the end-to-end model, and the tag list corresponding to the target sequence.

Additional effects of the foregoing optional manners will be described below in combination with specific embodiments.

BRIEF DESCRIPTION OF THE DRAWINGS

The accompanying drawings are used to better understand the solution, and do not constitute a limitation on the present disclosure, in which:

FIG. 1 is a schematic diagram according to a first embodiment of the present disclosure.

FIG. 2 is a schematic diagram according to a second embodiment of the present disclosure.

DETAILED DESCRIPTION

Figure 3:
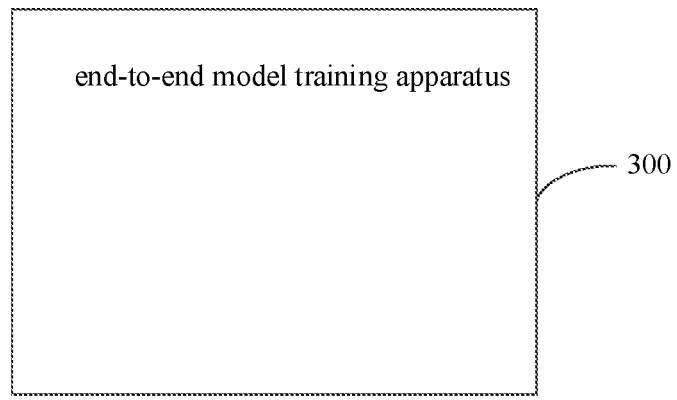
FIG. 3 is a schematic diagram according to a third embodiment of the present disclosure.

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

An end-to-end model training method and an end-to-end model training apparatus of the present disclosure are described below with reference to the drawings.

FIG. 1 is a schematic diagram according to a first embodiment of the present disclosure. It is noted that the execution body of the end-to-end model training method according to this embodiment is an end-to-end model training apparatus. The apparatus may be implemented by software and/or hardware. The apparatus may be configured in a server.

As illustrated in FIG. 1, the end-to-end model training method includes the following steps.

At step 101, training data containing a plurality of training samples is obtained, in which the plurality of training samples includes an original sequence, a target sequence and a corresponding tag list, the tag list includes importance tags in the target sequence and avoidance tags corresponding to the importance tags, and the avoidance tags are irrelevant tags corresponding to the importance tags.

In the embodiments of the present disclosure, the training data may be obtained in various manners, such as web crawlers, or by searching for open source data sets in the technical field to obtain the training data. It is noted that the training data may include but is not limited to the plurality of training samples, where the plurality of training samples may include but not limited to an original sequence, a target sequence and a corresponding tag list. For example, the tag list may include, but is not limited to, importance tags in the target sequence and avoidance tags corresponding to the importance tags. As another example, the tag list may include but is not limited to the respective target tags in the target sequence and indicators corresponding to the target tags, in which the indicator is configured to indicate whether the target tag is an importance tag, for example, the indicator 0 is configured to indicate that the target tag is not important, that is, the tag is not an importance tag; the indicator 1 is configured to indicate that the target tag is important, that is, the tag is an importance tag. In addition, it is noted that when the target sequence is a character sequence, the importance tag may be nouns and verbs in the character sequence.

For example, when translating an English sentence "On this issue, the United States and Iran conducted several rounds of negotiations, and eventually the two sides had to give in to each other", the original sequence is the English sentence "On this issue, the United States and Iran conducted several rounds of negotiations, and eventually the two sides had to give in to each other", and the target sequence is a Chinese sentence (Chinese translation) corresponding to the English sentence "在这个问题上，美国和伊朗进行了多轮洽谈，最终双方不得不互相退让一步", in which the nouns and verbs in the target sequence serve as importance tags, such as "美国 (United States)", "伊朗 (Iran)", "洽谈 (negotiations)", and "退让 (give in)".

In addition, the avoidance tag corresponding to the importance tag can be obtained by inputting the importance tag into a preset tag vector model to obtain correlation degrees between the importance tag and a plurality of preset tags, and selecting a tag from tags whose correlation degrees are smaller than a correlation degree threshold, and determining the tag as the avoidance tag corresponding to the importance tag. For example, word2vec (word to vector, a related model used to generate word vectors) is adopted to obtain the correlation degrees between the target tag and each word in a preset word list, and then select the least relevant word as the avoidance tag corresponding to the target tag. Afterwards, the importance tags and the avoidance tags corresponding to the importance tags may form a tag list.

At step 102, the training data is adopted to train a preset end-to-end model until a value of a preset optimization target function is smaller than a preset threshold, in which the optimization target function is determined according to the target sequence, a prediction sequence obtained after inputting the original sequence into the end-to-end model, and the tag list corresponding to the target sequence.

In order to make the end-to-end model produce prediction results that are consistent with the target tag as much as possible, and to avoid producing tags that are obviously misunderstood, in an embodiment of the present disclosure, after obtaining the training data, the training data is adopted to train a preset end-to-end model until a value of a preset optimization target function is smaller than a preset threshold. The optimization target function is determined according to the target sequence, a prediction sequence obtained after inputting the original sequence into the end-to-end model, and the tag list corresponding to the target sequence. For example, as illustrated in FIG. 2, FIG. 2 is a schematic diagram according to a second embodiment of the present disclosure. The preset optimization target function is obtained based on the target tags in the target sequence, the importance tags through calculation of the avoidance tags corresponding to the importance tags and the cross entropy of the corresponding prediction tags in the prediction sequence respectively, the specific implementation process is provided as follows.

At step 201, a first cross entropy of each target tag in the target sequence and a corresponding prediction tag in the prediction sequence is obtained.

As an example, the first cross entropy of each target tag in the target sequence and the corresponding prediction tag in the prediction sequence may be obtained by the following formula:

$$\text{the first cross entropy} = -\sum_{i=1}^{N}\sum_{c=1}^{C} p_{i,c} \log q_{i,c},$$

where N is a length of the target sequence, that is, the number of target tags in the target sequence; C is the number of tags in the preset word list. $p_{i,c}$ is a probability that the $i^{th}$ target tag in the target sequence is at a position c in the word list (which is 1, in general). $q_{i,c}$ is a probability that the prediction tag corresponding to the $i^{th}$ target tag in the prediction sequence is the $c^{th}$ tag in the word list. For example, assume that the tag at position c in the word list is "美国 (United States)" and the $i^{th}$ target tag in the target sequence is "美国 (United States)", then the probability that the $i^{th}$ target tag in the target sequence is at position c in the word list is 1. If the prediction tag corresponding to the $i^{th}$ target tag in the prediction sequence is "美国 (United States)", the prediction tag corresponding to the $i^{th}$ target tag in the prediction sequence is consistent with the $i^{th}$ target tag in the target sequence, that is, the value of $q_{i,c}$ is 1. If the prediction tag corresponding to the $i^{th}$ target tag in the prediction sequence is not "美国 (United States)", for example, "英国 (United Kingdom)", then the prediction tag corresponding to the $i^{th}$ target tag in the prediction sequence is inconsistent with the $i^{th}$ target tag in the target sequence, that is, the value of $q_{i,c}$ is 0.

At step 202, a second cross entropy of each importance tag in the target sequence and the corresponding prediction tag in the prediction sequence is obtained.

For example, a second cross entropy of each importance tag in the target sequence and the corresponding prediction tag in the prediction sequence is obtained by the following formula:

$$\text{the second cross entropy} = -\sum_{i \in key\_set}^{K} \sum_{c=1}^{C} p_{i,c} \log q_{i,c},$$

where K is the number of important tags in the target sequence, key_set is an index set of the importance tags in the target sequence, and C is the number of tags in the preset word list. $p_{i,c}$ is a probability that the $i^{th}$ important tag is at position c in the word list (which is 1, in general). $q_{i,c}$ is the probability that the prediction tag corresponding to the $i^{th}$ importance tag in the prediction sequence is the $c^{th}$ tag in the word list.

At step 203, a third cross entropy of an avoidance tag of each importance tag in the target sequence and the corresponding prediction tag in the prediction sequence is obtained.

For example, a third cross entropy of an avoidance tag of each importance tag in the target sequence and the corresponding prediction tag in the prediction sequence is obtained by the following formula:

$$\text{the third cross entropy} = -\sum_{i \in key\_set}^{k} \sum_{c=1}^{C} p'_{i,c} \log q_{i,c},$$

where K is the number of important tags in the target sequence, key_set is an index set of the importance tags in the target sequence, and C is the number of tags in the preset word list. $p_{i,c}$ is a probability that the $i^{th}$ important tag is at position c in the word list (which is 1, in general). $q_{i,c}$ is the probability that the prediction tag corresponding to the $i^{th}$ importance tag in the prediction sequence is the $c^{th}$ tag in the word list. For example, assuming that the $c^{th}$ tag in the word list is "美国(United States)", the $i^{th}$ important tag in the target sequence is "美国(United States)", and the avoidance tag corresponding to "美国(United States)" is "中国(China)", then the probability of the $i^{th}$ importance tag corresponding to the avoidance tag at position c in the word list is 0. Assuming that the $c^{th}$ tag in the word list is "中国(China)", the $i^{th}$ importance tag in the target sequence is "美国(United States)", and the avoidance tag corresponding to "美国(United States)" is "中国(China)", then the probability of the $i^{th}$ importance tag corresponding to the avoidance tag at position c in the word list is 1.

At step 204, weighed addition is performed on the first cross entropy, the second cross entropy, and the third cross entropy to obtain the optimization target function.

In order to determine the optimization target function according to the importance of each cross entropy, in an embodiment of the present disclosure, weighed addition is performed on the first cross entropy, the second cross entropy, and the third cross entropy to obtain the optimization target function. As an example, weighed addition is performed on the first cross entropy, the second cross entropy, and the third cross entropy by the following code to obtain the optimization target function by:

$$\text{optimization target function} = -\lambda_1 \sum_{i=1}^{N} \sum_{c=1}^{C} p_{i,c} \log q_{i,c} -$$

$$\lambda_2 \sum_{i \in key\_set}^{K} \sum_{c=1}^{C} p_{i,c} \log q_{i,c} + \lambda_3 \sum_{i \in key\_set}^{k} \sum_{c=1}^{C} p'_{i,c} \log q_{i,c},$$

where $\lambda_1$, $\lambda_2$ and $\lambda_3$ are experiential parameters for controlling the weights of the corresponding optimization target function.

In conclusion, by improving the training data of the end-to-end learning model and the optimization target function, and combining the improved training data and the optimization target function to train the end-to-end learning model, the trained end-to-end model can screen out poor results that greatly affect the entire result, thus the accuracies of the models are improved.

With the end-to-end model training method, training data containing a plurality of training samples is obtained, in which the plurality of training samples includes an original sequence, a target sequence and a corresponding tag list, the tag list includes importance tags in the target sequence and avoidance tags corresponding to the importance tags, and the avoidance tags are irrelevant tags corresponding to the importance tags; and the training data is adopted to train a preset end-to-end model until a value of a preset optimization target function is smaller than a preset threshold, in which the optimization target function is determined according to the target sequence, a prediction sequence obtained after inputting the original sequence into the end-to-end model, and the tag list corresponding to the target sequence. Therefore, by improving the training data of the end-to-end learning model and the optimization target function, and combining the improved training data and the optimization target function to train the end-to-end learning model, the trained end-to-end model can screen out poor results that greatly affect the entire result, thus the accuracies of the models are improved.

Corresponding to the end-to-end model training method according to the foregoing embodiments, an embodiment of the present disclosure also provides an end-to-end model training apparatus. The end-to-end model training apparatus corresponds to the end-to-end model training method according to the foregoing embodiments. Therefore, the implementation of the end-to-end model training method is also applicable for the end-to-end model training apparatus according to the present embodiment, which is not described in detail in this embodiment. FIG. 3 is a schematic diagram according to a third embodiment of the present disclosure. As illustrated in FIG. 3, an end-to-end model training apparatus 300 includes: an obtaining module 310 and a training module 320.

The obtaining module 310 is configured to obtain training data containing a plurality of training samples, in which the plurality of training samples include an original sequence, a target sequence and a corresponding tag list, the tag list includes importance tags in the target sequence and avoidance tags corresponding to the importance tags, and the avoidance tags are irrelevant tags corresponding to the importance tags.

The training module 320 is configured to adopt the training data to train a preset end-to-end model until a value of a preset optimization target function is smaller than a preset threshold, in which the optimization target function is determined according to the target sequence, a prediction sequence obtained after inputting the original sequence into the end-to-end model, and the tag list corresponding to the target sequence.

In a possible implementation, the optimization target function is determined by performing acts of: obtaining a first cross entropy of each target tag in the target sequence and a corresponding prediction tag in the prediction sequence; obtaining a second cross entropy of each importance tag in the target sequence and the corresponding prediction tag in the prediction sequence; obtaining a third cross entropy of an avoidance tag of each importance tag in the target sequence and the corresponding prediction tag in the prediction sequence; and performing weighed addition on the first cross entropy, the second cross entropy, and the third cross entropy to obtain the optimization target function.

In a possible implementation, when the target sequence is a character sequence, the importance tag is nouns and verbs in the character sequence.

In a possible implementation, the avoidance tags corresponding to the importance tags are determined by performing acts of: inputting each importance tag into a preset tag vector model to obtain correlation degrees between the importance tag and a plurality of preset tags; and selecting a tag from tags whose correlation degrees are smaller than a correlation degree threshold, and determining the tag as the avoidance tag corresponding to the importance tag.

With the end-to-end model training apparatus, training data containing a plurality of training samples is obtained, in which the plurality of training samples includes an original sequence, a target sequence and a corresponding tag list, the tag list includes importance tags in the target sequence and avoidance tags corresponding to the importance tags, and the avoidance tags are irrelevant tags corresponding to the importance tags; and the training data is adopted to train a preset end-to-end model until a value of a preset optimization target function is smaller than a preset threshold, in which the optimization target function is determined according to the target sequence, a prediction sequence obtained after inputting the original sequence into the end-to-end model, and the tag list corresponding to the target sequence. Therefore, by improving the training data of the end-to-end learning model and the optimization target function, and combining the improved training data and the optimization target function to train the end-to-end learning model, the trained end-to-end model can screen out poor results that greatly affect the entire result, thus the accuracies of the models are improved.

According to the embodiments of the present disclosure, the present disclosure also provides an electronic device and a readable storage medium.

Figure 4:
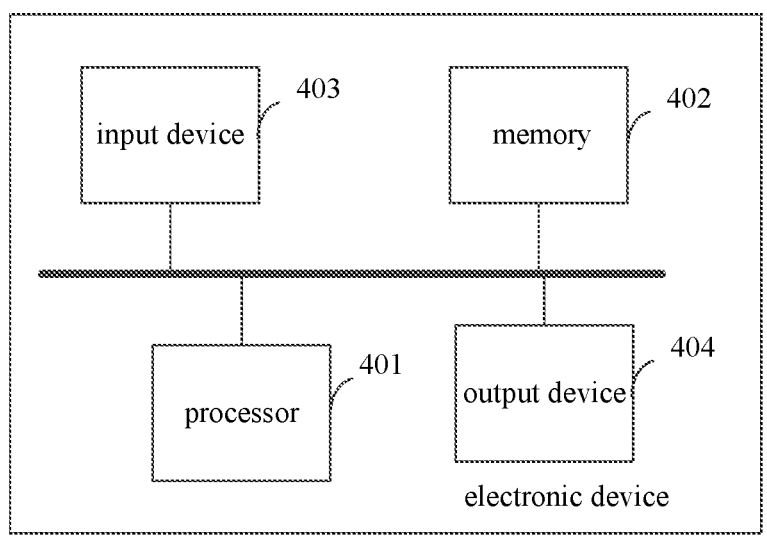
FIG. 4 is a block diagram of an electronic device for implementing an end-to-end model training method according to an embodiment of the present disclosure.

FIG. 4 is a block diagram of an electronic device used to implement the method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 4, the electronic device includes: one or more processors 401, a memory 402, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 401 is taken as an example in FIG. 4.

The memory 402 is a non-transitory computer-readable storage medium according to the present disclosure. The memory stores instructions executable by at least one processor, so that the at least one processor executes the voice control method according to the present disclosure. The non-transitory computer-readable storage medium of the present disclosure stores computer instructions, which are used to cause a computer to execute the method according to the present disclosure.

As a non-transitory computer-readable storage medium, the memory 402 is configured to store non-transitory software programs, non-transitory computer executable programs and modules, such as program instructions/modules corresponding to the voice skill creation method in the embodiment of the present disclosure (For example, the obtaining module 310 and the training module 320 shown in FIG. 3). The processor 401 executes various functional applications and data processing of the server by running non-transitory software programs, instructions, and modules stored in the memory 402, that is, implementing the method in the foregoing method embodiment.

The memory 402 may include a storage program area and a storage data area, where the storage program area may store an operating system and application programs required for at least one function. The storage data area may store data created according to the use of the electronic device, and the like. In addition, the memory 402 may include a high-speed random access memory, and a non-transitory memory, such as at least one magnetic disk storage device, a flash memory device, or other non-transitory solid-state storage device. In some embodiments, the memory 402 may optionally include a memory remotely disposed with respect to the processor 401, and these remote memories may be connected to the electronic device through a network. Examples of the above network include, but are not limited to, the Internet, an intranet, a local area network, a mobile communication network, and combinations thereof.

The electronic device for implementing an end-to-end model training method may further include an input device 403 and an output device 404. The processor 401, the memory 402, the input device 403, and the output device 404 may be connected through a bus or in other manners. In FIG. 4, the connection through the bus is taken as an example.

The input device 403 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 404 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

It should be understood that the various forms of processes shown above can be used to reorder, add, or delete steps. For example, the steps described in this application can be executed in parallel, sequentially, or in different orders, as long as the desired results of the technical solutions disclosed in this application can be achieved, which is no limited herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. An end-to-end model training method, comprising:
   obtaining training data containing a plurality of training samples, wherein the plurality of training samples comprise an original sequence, a target sequence and a corresponding tag list, the tag list comprises importance tags in the target sequence and avoidance tags corresponding to the importance tags, and the avoidance tags are irrelevant tags corresponding to the importance tags; and
   adopting the training data to train a preset end-to-end model until a value of a preset optimization target function is smaller than a preset threshold, wherein the optimization target function is determined according to the target sequence, a prediction sequence obtained after inputting the original sequence into the end-to-end model, and the tag list corresponding to the target sequence,
   wherein the optimization target function is determined by performing acts of:
   obtaining a first cross entropy of each target tag in the target sequence and a corresponding prediction tag in the prediction sequence;
   obtaining a second cross entropy of each importance tag in the target sequence and the corresponding prediction tag in the prediction sequence;
   obtaining a third cross entropy of an avoidance tag of each importance tag in the target sequence and the corresponding prediction tag in the prediction sequence; and
   performing weighed addition on the first cross entropy, the second cross entropy, and the third cross entropy to obtain the optimization target function.

2. The method according to claim 1, wherein when the target sequence is a character sequence, the importance tag is nouns and verbs in the character sequence.

3. The method according to claim 1, wherein the avoidance tags corresponding to the importance tags are determined by performing acts of:
   inputting each importance tag into a preset tag vector model to obtain correlation degrees between the importance tag and a plurality of preset tags; and
   selecting a tag from tags whose correlation degrees are smaller than a correlation degree threshold, and determining the tag as the avoidance tag corresponding to the importance tag.

4. An end-to-end model training apparatus, comprising: a non-transitory computer-readable medium including computer-executable instructions stored thereon, and an instruction execution system which is configured by the instructions to implement at least one of:

an obtaining module, configured to obtain training data containing a plurality of training samples, wherein the plurality of training samples comprise an original sequence, a target sequence and a corresponding tag list, the tag list comprises importance tags in the target sequence and avoidance tags corresponding to the importance tags, and the avoidance tags are irrelevant tags corresponding to the importance tags; and a training module, configured to adopt the training data to train a preset end-to-end model until a value of a preset optimization target function is smaller than a preset threshold, wherein the optimization target function is determined according to the target sequence, a prediction sequence obtained after inputting the original sequence into the end-to-end model, and the tag list corresponding to the target sequence, wherein the optimization target function is determined by performing acts of:

obtaining a first cross entropy of each target tag in the target sequence and a corresponding prediction tag in the prediction sequence;

obtaining a second cross entropy of each importance tag in the target sequence and the corresponding prediction tag in the prediction sequence;

obtaining a third cross entropy of an avoidance tag of each importance tag in the target sequence and the corresponding prediction tag in the prediction sequence; and performing weighed addition on the first cross entropy, the second cross entropy, and the third cross entropy to obtain the optimization target function.

5. The apparatus according to claim 4, wherein when the target sequence is a character sequence, the importance tag is nouns and verbs in the character sequence.

6. The apparatus according to claim 4, wherein the avoidance tags corresponding to the importance tags are determined by performing acts of:

inputting each importance tag into a preset tag vector model to obtain correlation degrees between the importance tag and a plurality of preset tags; and selecting a tag from tags whose correlation degrees are smaller than a correlation degree threshold, and determining the tag as the avoidance tag corresponding to the importance tag.

7. A non-transitory computer-readable storage medium storing computer instructions, wherein when the computer instructions are executed by a processor, the processor is caused to implement an end-to-end model training method, and the method comprises:

obtaining training data containing a plurality of training samples, wherein the plurality of training samples comprise an original sequence, a target sequence and a corresponding tag list, the tag list comprises importance tags in the target sequence and avoidance tags corresponding to the importance tags, and the avoidance tags are irrelevant tags corresponding to the importance tags; and adopting the training data to train a preset end-to-end model until a value of a preset optimization target function is smaller than a preset threshold, wherein the optimization target function is determined according to the target sequence, a prediction sequence obtained after inputting the original sequence into the end-to-end model, and the tag list corresponding to the target sequence, wherein the optimization target function is determined by performing acts of:

obtaining a first cross entropy of each target tag in the target sequence and a corresponding prediction tag in the prediction sequence;

obtaining a second cross entropy of each importance tag in the target sequence and the corresponding prediction tag in the prediction sequence;

obtaining a third cross entropy of an avoidance tag of each importance tag in the target sequence and the corresponding prediction tag in the prediction sequence; and performing weighed addition on the first cross entropy, the second cross entropy, and the third cross entropy to obtain the optimization target function.

8. The non-transitory computer-readable storage medium according to claim 7, wherein when the target sequence is a character sequence, the importance tag is nouns and verbs in the character sequence.

9. The non-transitory computer-readable storage medium according to claim 7, wherein the avoidance tags corresponding to the importance tags are determined by performing acts of:

inputting each importance tag into a preset tag vector model to obtain correlation degrees between the importance tag and a plurality of preset tags; and selecting a tag from tags whose correlation degrees are smaller than a correlation degree threshold, and determining the tag as the avoidance tag corresponding to the importance tag.

\* \* \* \* \*